Aug. 1, 1967   C. H. SATTERLEE   3,334,044
WATER CONDITIONING PROCESS AND APPARATUS
Filed Dec. 6, 1963

Charles H. Satterlee
INVENTOR.

BY
Attorneys

Aug. 1, 1967  C. H. SATTERLEE  3,334,044
WATER CONDITIONING PROCESS AND APPARATUS
Filed Dec. 6, 1963  3 Sheets-Sheet 2

Charles H. Satterlee
INVENTOR.

BY *Clarence A. O'Brien*
*and Harvey B. Jacobson*
Attorneys

Aug. 1, 1967 C. H. SATTERLEE 3,334,044
WATER CONDITIONING PROCESS AND APPARATUS
Filed Dec. 6, 1963 3 Sheets-Sheet 3

Charles H. Satterlee
INVENTOR.

BY *[signatures]*
Attorneys

United States Patent Office 3,334,044
Patented Aug. 1, 1967

3,334,044
WATER CONDITIONING PROCESS AND
APPARATUS
Charles H. Satterlee, 2201 Monument Road,
Imperial Beach, Calif. 92032
Filed Dec. 6, 1963, Ser. No. 328,627
16 Claims. (Cl. 210—25)

This invention relates to a method and apparatus for treatment of water.

The method of the present invention involves an ion exchange process wherein water is passed in succession through a plurality of chambers containing cation and anion exchange materials. Chemical compounds contained in the water are thereby removed in a manner well known by the ion exchange material which eventually becomes exhausted and must be either replaced or regenerated. Effective treatment of the water by the ion exchange process is effected in accordance with the principles of the present invention by successively passing the raw or untreated water through cation exchange material, anion exchange material and mixtures of cation and anion exchange materials. Also preceding the ion exchange process, the untreated water is passed through a filter bed containing activated carbon for removal of certain ingredients such as chlorine.

As a further object of the present invention in accordance with the foregoing, facilities are provided for indicating exhaustion of the ion exchange material by passage of the treated water through a reserve chamber containing a mixture of the cation and anion exchange materials. Conductivity measuring apparatus is therefore provided adjacent the upper end of the reserve chamber for measuring the conductivity of the mixture therein. A change in the conductivity will therefore reflect the condition of the ion exchange material in the other chambers as the ion exchange process extends into the reserve chamber when the materials in the other ion exchange chambers become exhausted.

Another object of the present invention is to provide apparatus for treating water by passage thereof in succession through a plurality of separate chambers containing water-treating materials. A single tank is therefore partitioned into the chambers and filtering conduits mounted within each of the chambers so as to conduct an upward flow of water from the bottom of the chamber to the top of the next adjacent chamber. Water inlet means is therefore provided so as to supply water under a sufficient pressure to the first chamber causing the water to flow upwardly through each of the filtering conduits after it has passed downwardly through the water-treating material within the chamber. The final chamber from which the treated water is discharged, is smallest in volume and contains the aforementioned reserve supply of cation and anion exchange materials. The treated water is therefore discharged into a vented reservoir within which the treated water is accumulated up to a predetermined volume. A level-responsive flow valve therefore responds to the accumulation of treated water in the reservoir in order to cut off the supply of water through the inlet means. The inlet means may therefore be provided with a pressure regulator and/or a flow-metering device in order to maintain the requisite pressure differential between the treated water and the untreated water entering the apparatus, necessary to maintain upward flow through the filtering conduits and downward flow through the water-treating materials so as to effectively condition the water for drinking purposes, or render it suitable for batteries, steam irons, etc. The apparatus is also constructed so that it may be installed over treated water reservoirs of various types associated for example with drinking water dispensers now in general use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGUURE 1 is a perspective view of the water-treating apparatus shown in one typical installation.

Figure 2:
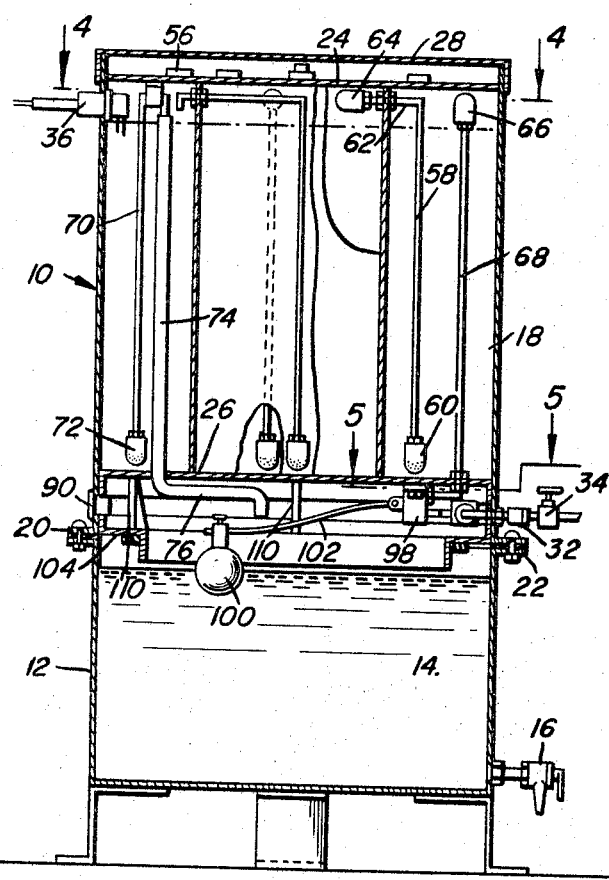
FIGURE 2 is a sectional view of the apparatus taken substantially through a plane indicated by section line 2—2 in FIGURE 1.
Figure 1:
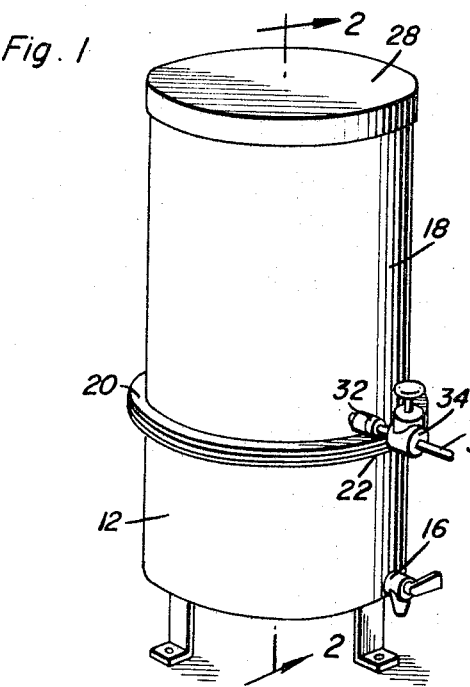

Referring to the drawings in detail, and initially to FIGURES 1 through 4, it will be observed that the water-treating apparatus generally referred to by reference numeral 10 is mounted above a water reservoir tank 12 containing treated water 14 adapted to be withdrawn for use through the spigot 16. The water-treating apparatus 10 may therefore be provided with an outer housing in the form of a cylindrical tank 18 having a lower annular flange 20 adapted to be bolted in sealed relation to the upper seating flange 22 on the reservoir tank 12. A pressure-sealed space is formed within the tank 18 between a top end plate 24 and a bottom plate 26 welded to the sides of the tank 18. A cover 28 may also be provided closing the upper end of the tank 18 above the top end plate 24. Water under pressure from any water supply main is conducted to the tank 18 and connected thereto below the bottom plate 26 by means of the supply conduit 30 connected to the inlet conduit projecting from the tank 18 by means of a quick disconnect fitting 32, the supply conduit 30 also being provided with a manual cutoff valve 34. Also mounted on the tank 18 adjacent the upper end thereof, is a conductivity measuring device 36 operative to indicate exhaustion of the water-treating materials contained within the apparatus 10 as will be hereafter explained.

Figure 4:
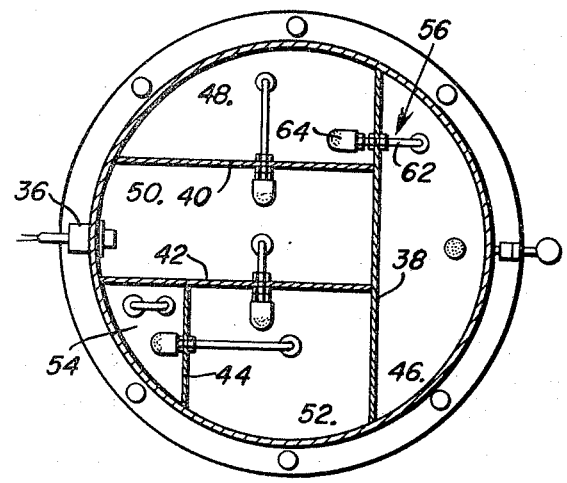
FIGURE 4 is a transverse sectional view taken substantially through a plane indicated by section line 4—4 in FIGURE 2.
Figure 7:
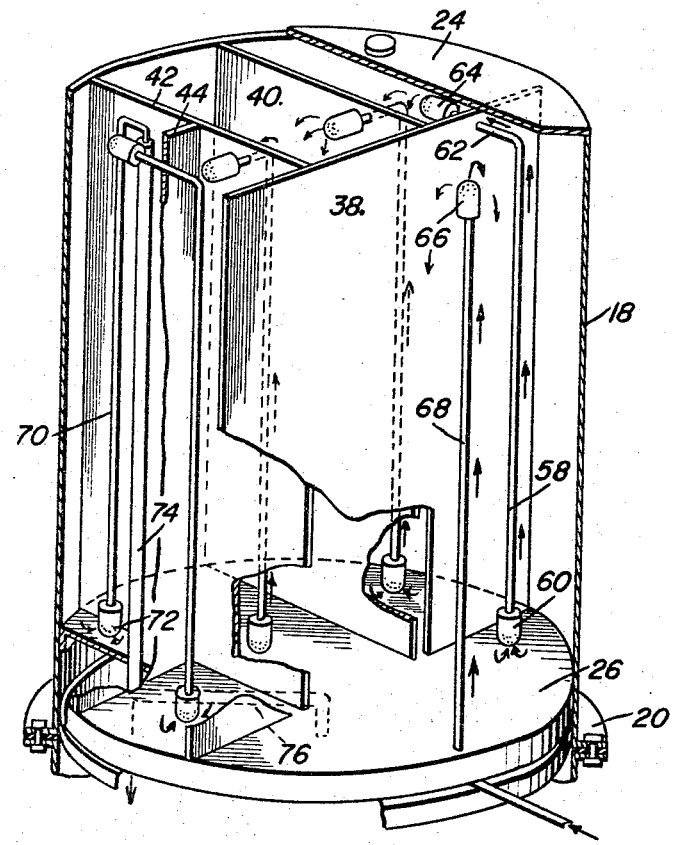
FIGURE 7 is a perspective view of the apparatus with parts broken away or removed.

Referring now to FIGURES 2, 4 and 7 in particular, it will be observed that the pressure space within the tank 18 between the bottom plate 26 and the top end plate 24 is divided into a plurality of separate chambers by partitioning walls 38, 40, 42 and 44. The partitioning walls extend vertically between the bottom and top end plates and are secured to each other so as to seal the chambers from each other. The partition wall 38 encloses a chordal section of the cylinder to form an inlet chamber 46 which is preferably larger in volume than the other chambers. A second chamber 48 is formed by the partition plate 40 between the tank wall and the partition plate 38 on one side of the partition plate 40, a third chamber 50 being formed on the other side of the partition plate 40 between the partition plate 40 and partition plate 42. A fourth chamber 52 is formed between the partition plate 42, the partition plate 38 and the partition plate 44.

Finally, a reserve chamber 54 smaller in volume than the other chambers is formed between the partition plate 42 and the partition plate 44. Mounted on the top end plate 24 and associated with each of the chambers 46, 48, 50, 52 and 54, is an air bleeder plug 56 arranged to vent excess air to assure complete filling of the chambers with water prior to shipment of the unit 10.

The water-treating materials within the inlet chamber 46 consist of filtering material such as layers of rock and sand and activated carbon effective to remove chlorine and other gases that may be entrained within the water being treated. Water after passing through the chamber 46 then passes through the chamber 48 which contains a cation exchange material such as sulphonated phenol-formaldehyde resins. The following chamber 50 through which the water passes contains the anion exchange material such as an amino-aldehyde resin. The next chamber 52 forming a final polishing bed for the water contains a mixture of the cation and anion resins aforementioned. The water is finally passed through the reserve chamber 54 within which there is a reserve supply of the mixture of cation and anion exchange materials.

In order to conduct the water in succession through each of the chambers, each partition plate mounts a filtering conduit assembly 56 for conducting an upward flow of water from the bottom of one chamber to the top of the next chamber of the sequence aforementioned. The filtering conduit assembly 56 mounted on the partition plate 38 for example includes a vertical conduit section 58 having a screen fitting 60 connected to the lower end thereof adjacent the bottom plate 26 so as to prevent particulate matter from entering the conduit section 58 with the water conducted upwardly therethrough as indicated by the arrows in FIGURE 7. The upward flow of water from chamber 46 is therefore discharged into the top of the next chamber 48 from a horizontal conduit section 62 extending through the partition plate 38 and terminating within the next chamber 48. Connected to the discharge end of the horizontal conduit section 62, is another screened fitting 64. Similar filtering conduit assemblies extend between the chamber 48 and chamber 50, between the chamber 50 and the chamber 52 and between the chamber 52 and the chamber 54. Water under regulated inlet pressure is therefore supplied to the chamber 46 through a screen fitting 66 at the upper end of a vertical inlet tube 68 and is discharged from the chamber 54 by means of a vertical outlet tube 70 through which the treated water flows upwardly from the screen fitting 72 connected to its lower end. The outlet tube 70 is connected at its upper end to a larger diameter discharge conduit 74 so as to prevent any siphoning action from occurring, the discharge conduit 74 having a horizontal section 76 disposed below the bottom plate 26 so as to discharge the treated water centrally into the reservoir tank 12 disposed therebelow.

Figure 9:
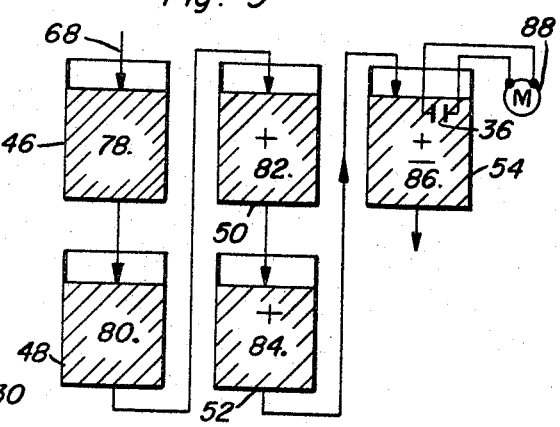
FIGURE 9 is a schematic flow diagram illustrating the method of the present invention.
Figure 3:
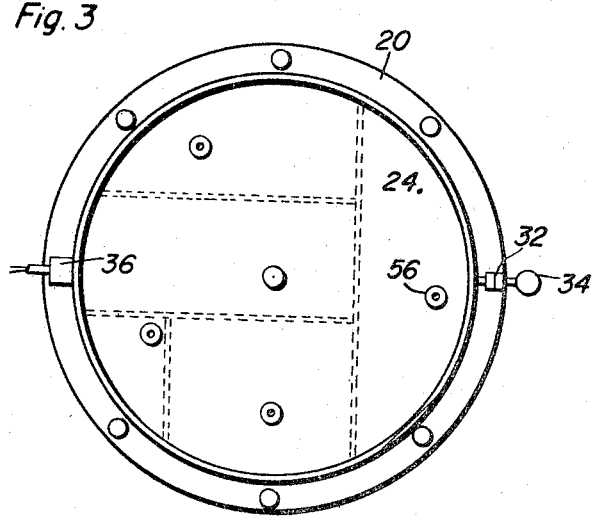
FIGURE 3 is a top plan view of the apparatus illustrated in FIGURES 1 and 2.

Referring now to FIGURE 9, the water treatment process may be more readily followed and reviewed. It will therefore be observed, that untreated water is admitted through inlet tube 68 to the upper end of the chamber 46 for passage through a filtering bed 78 containing activated carbon. After passing downwardly through the bed 78, the filtered water is then introduced to the upper end of the ion exchange chamber 48 containing a cation exchange material 80 as aforementioned. After passing through the bed 80, the water is introduced at the upper end of the chamber 50 containing a bed of anion exchange material 82. The water is then conducted from the bottom of the chamber 50 to the top of the chamber 52 containing the mixture 84 of cation and anion exchange materials. The treated water is then finally introduced at the upper end of the reserve chamber 54 for passage through the reserve mixture 86 before being discharged. The conductivity-measuring device 36 is mounted within the material mixture 86 adjacent the upper end of the chamber 54 so that it may be connected in a circuit to any suitable metering device 88 providing an indication of the conductivity of the reserve mixture 86. It will therefore be apparent, that the conductivity will change when the reserve mixture 86 begins to participate in the ion exchange process should the ion exchange materials in chambers 48, 50 and 52 become exhausted. The materials within the ion exchange chambers must then be either replaced or regenerated.

Figure 5:
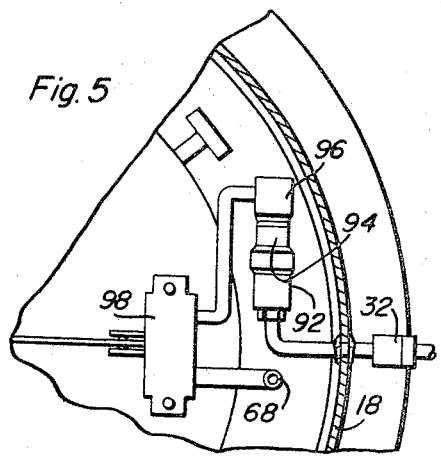
FIGURE 5 is an enlarged partial sectional view taken substantially through a plane indicated by section line 5—5 in FIGURE 2.

The flow of water through the various chambers in succession, is maintained under a relatively low differential pressure between the pressure in the reservoir tank 12 into which the treated water is discharged and the pressure of the water in the inlet tube 68. The reservoir tank 12 is therefore maintained under atmospheric pressure by venting through an air filtering vent device 90 mounted adjacent the lower end of the tank 18 below the bottom plate 26 as shown in FIGURE 2. With continued reference to FIGURE 2 and FIGURE 5, it will be observed that the water supply conduit is connected by the quick disconnect fitting 32 to the inlet end of a microfilter 92 preventing flow of any particulate material into the apparauts. After passing through the filter 92, the untreated water passes through a flow-metering device 94 and then through a pressure regulator 96 before being led to the inlet end of a float-operated cutoff valve 98. The outlet of the cutoff valve 98 is therefore connected to the lower end of the inlet tube 68 aforementioned so as to supply thereto, water under regulated pressure. The valve devices 98, 96 and metering and filter devices 94, 92 are housed within the tank 18 below the bottom plate 26. The cutoff valve 98 is operated by means of the float element 100 sensing the level of the treated water 14 within the reservoir tank 12 in order to angularly position the actuating lever 102 operatively connected to the cutoff valve 98. Accordingly, when a predetermined volume of treated water 14 is accumulated within the reservoir tank, the cutoff valve 98 will be closed so as to prevent further treatment of water.

Figure 6:
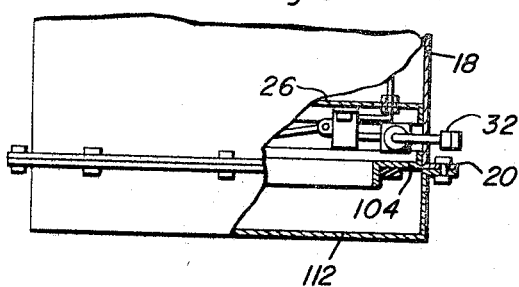
FIGURE 6 is a partial side elevational view of the water-treating apparatus in a transport condition with parts broken away and shown in section.
Figure 8:
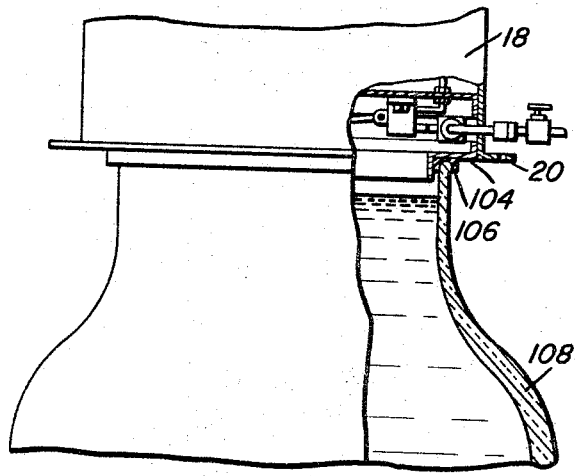
FIGURE 8 is a partial side elevational view with parts broken away and shown in section of the apparatus in another installation.

It will be appreciated, that the apparatus 10 may be mounted on any suitable reservoir container for treated water. Accordingly, the lower end of the tank 18 may have welded thereto an annular flange member 104 projecting radially inwardly and having an annular sealing element 106 so as to be received on the bottle water dispenser 108 for example as illustrated in FIGURE 8. The adapter flange 104 may therefore be braced by a plurality of circumferentially spaced brace elements 110 which extend between the bottom plate 26 and the flange 104 as shown in FIGURE 2. Also, a pan 112 may be provided having a flange adapted to be bolted to the mounting flange 20 of the tank 18 for transport purposes. The depth of the pan 112 will therefore be such as to accommodate the float 100 therewithin. The water-treating apparatus may thereby be protectively enclosed as shown in FIGURE 6.

From the foregoing description, the construction, operation and utility of the water-conditioning apparatus of the present invention will be apparent. It will therefore be appreciated that the apparatus is operable under a low pressure differential to produce downward flow of water through water-treating materials in a plurality of chambers into which the apparatus tank is divided. The apparatus is also easily transportable and installed in different installations. Effective treatment of water is accomplished with compact equipment economical in cost, operation and maintenance. The apparatus also provides facilities for indicating need for replacement or regeneration of the ion exchange materials utilized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a system of treating water by sequential passage thereof through differing ion exchange materials, a method for monitoring said ion exchange materials comprising the steps of: passing the treated water through a separate portion of a mixture of the said differing ion exchange materials; and measuring any change in conductivity of the said separate mixture resulting from further ion exchange between the said separate mixture and the treated water to detect exhaustion of the ion materials utilized during treatment of the water.

2. In a method of treating water, the steps of: sequentially passing the water through a quantity of cation exchange material and anion exchange material, sufficient to fully treat the water; passing the treated water through a mixture of the same cation and anion exchange materials; and measuring the conductivity of the mixture to indicate exhaustion of the cation and anion materials used during treatment of the water.

3. In a method of treating water, the steps of: sequentially conducting water through a plurality of cation and anion exchange chambers for complete removal of cations and anions; conducting the deionized water through a reserve chamber containing a mixture of cation and anion exchange material; and measuring the degree to which ion exchange occurs in the reserve chamber by measuring the conductivity change of the said mixture to indicate cation and anion exhaustion of cation and anion exchange material in the exchange chambers.

4. Apparatus for treating water comprising; a tank, partition means dividing said tank into a plurality of separate chambers having upper and lower ends, filtering conduit means mounted by the partition means in each chamber for conducting water upwardly from the lower end thereof to the upper end of an adjacent chamber, inlet means for introducing water to one of said chambers under an inlet pressure inducing sequential flow thereof upwardly through the filtering conduit means in each of said chambers, each of said chambers containing water-treating materials through which the water flows downwardly, another of said chambers finally discharging the treated water at a pressure lower than said inlet pressure.

5. The combination of claim 4 including a reservoir for treated water discharged from said other chamber, and volume-responsive means operatively connected to the inlet means for cutting off flow of water to said one chamber when a predetermined volume of treated water is accumulated in the reservoir.

6. The combination of claim 4 wherein said one chamber is largest in volume and said other chamber is smallest in volume.

7. The combination of claim 6 wherein said water-treating materials in the respective chambers include, cation exchange resins, anion exchange resins and mixtures of said cation and anion exchange resins.

8. The combination of claim 7 wherein the materials in said one chamber comprise filtering matter and activated carbon.

9. The combination of claim 8 wherein the materials in said other chamber are a reserve mixture of cation and anion exchange resins, and conductivity-measuring means mounted in said other chamber for indicating exhaustion of the cation and anion exchange resins throughout the chambers.

10. The combination of claim 9 including a reservoir for treated water discharged from said other chamber, and volume-responsive means operatively connected to the inlet means for cutting off flow of water to said one chamber when a predetermined volume of treated water is accumulated in the reservoir.

11. The combination of claim 4 wherein said water-treating materials in the respective chambers include, cation exchange resins, anion exchange resins and mixtures of said cation and anion exchange resins.

12. The combination of claim 11 wherein the materials in said other chamber are a reserve mixture of cation and anion exchange resins, and conductivity-measuring means mounted in said other chamber for indicating exhaustion of the cation and anion exchange resins throughout the chambers.

13. The combination of claim 4 wherein the materials in said one chamber comprise filtering matter and activated carbon.

14. The combination of claim 13 including a reservoir for treated water discharged from said other chamber, and volume-responsive means operatively connected to the inlet means for cutting off flow of water to said one chamber when a predetermined volume of treated water is accumulated in the reservoir.

15. The combination of claim 4 wherein the materials in said other chamber are a reserve mixture of cation and anion exchange resins, and conductivity-measuring means mounted in said other chamber for indicating exhaustion of the cation and anion exchange resins throughout the chambers.

16. The combination of claim 15 wherein the materials in said one chamber comprise filtering matter and activated carbon.

References Cited
UNITED STATES PATENTS

| | | | |
|---|---|---|---|
| 2,615,924 | 10/1952 | Reents | 210—24 X |
| 2,617,766 | 11/1952 | Emmett et al. | 210—25 |
| 2,711,995 | 6/1955 | Sard | 210—25 |
| 2,774,732 | 12/1956 | Elight | 210—25 |
| 2,962,438 | 11/1960 | Smith | 210—37 |
| 3,062,739 | 11/1962 | Grits | 210—24 |

JOSEPH SCOVRONEK, *Acting Primary Examiner.*

MORRIS O. WOLK, E. G. WHITBY,
*Assistant Examiners.*